United States Patent
Hsiao

(10) Patent No.: US 8,412,893 B2
(45) Date of Patent: Apr. 2, 2013

(54) DATA STORAGE DEVICE AND METHOD FOR HANDLING DATA READ OUT FROM MEMORY USING A PING-PONG BUFFER

(75) Inventor: Wei-Yi Hsiao, Kaohsiung (TW)

(73) Assignee: Silicon Motion, Inc., Jhubei, Hsinchu County (TW)

( * ) Notice: Subject to any disclaimer, the term of this patent is extended or adjusted under 35 U.S.C. 154(b) by 471 days.

(21) Appl. No.: 12/822,288

(22) Filed: Jun. 24, 2010

(65) Prior Publication Data

US 2011/0179249 A1 Jul. 21, 2011

(30) Foreign Application Priority Data

Jan. 15, 2010 (TW) ................................ 99101021 A

(51) Int. Cl.
*G06F 12/00* (2006.01)
(52) U.S. Cl. ........ 711/154; 711/157; 711/167; 711/170; 711/173; 710/52; 710/53
(58) Field of Classification Search .................. 711/154, 711/157, 167, 170, 173; 710/52, 53
See application file for complete search history.

(56) References Cited

U.S. PATENT DOCUMENTS

| 6,507,877 | B1 * | 1/2003 | Ross | 710/53 |
| 6,775,722 | B2 * | 8/2004 | Wu et al. | 710/53 |
| 6,964,005 | B2 * | 11/2005 | Hollums | 714/752 |
| 7,111,093 | B2 * | 9/2006 | Navada et al. | 710/53 |
| 7,167,114 | B2 * | 1/2007 | Champion | 341/81 |

* cited by examiner

*Primary Examiner* — Arpan P. Savla
(74) *Attorney, Agent, or Firm* — McClure, Qualey & Rodack, LLP

(57) ABSTRACT

The invention provides a method for handling data read out from a memory. In one embodiment, a controller corresponding to the memory comprises a ping-pong buffer. First, a first sector read time period required by the memory to read and output a data sector to the ping-pong buffer is calculated. A second sector read time period required by a host to read a data sector from the ping-pong buffer is calculated. A page switch time period required by the memory to switch a target read page is obtained. A total sector number is determined according to the first sector read time period, the second sector read time period, and the page switch time period. When the memory outputs data to the ping-pong buffer, a first buffer and a second buffer of the ping-pong buffer are switched to receive the data output by the memory according to the total sector number.

16 Claims, 5 Drawing Sheets

DATA STORAGE DEVICE AND METHOD FOR HANDLING DATA READ OUT FROM MEMORY USING A PING-PONG BUFFER

CROSS REFERENCE TO RELATED APPLICATIONS

This application claims priority of Taiwan Patent Application No. 99101021, filed on Jan. 15, 2010, the entirety of which is incorporated by reference herein.

BACKGROUND OF THE INVENTION

1. Field of the Invention

The invention relates to memory controllers, and more particularly to ping-pong buffers of memory controllers.

2. Description of the Related Art

A memory is used by a host for data storage. For example, a flash memory comprises a plurality of blocks, each block comprises a plurality of pages, and each page can store a plurality of data sectors. The host does not directly access data from memory. When the host wants to read data stored in the memory, the host sends a read command to a controller, and the controller then reads data from the memory according to the read command, and then delivers the data to the host. When the host wants to write data to the memory, the host sends data and a write command to the controller, and the controller then writes the data to the memory according to the write command.

When the controller reads data from the memory, the controller sends information about an address range determined by the host to the memory, and the memory then outputs data stored in the address range to the controller. The controller comprises a ping-pong buffer which further comprises at least two buffers. When the controller receives data output by the memory, the controller stores the received data in a buffer of the ping-pong buffer, and the host then reads data from the buffer.

When the address range read by the host comprises a plurality of pages, the memory sequentially reads the pages and then outputs data stored in the pages to the controller. Each page of the memory stores a plurality of data sectors. When a target read page is read, the memory sequentially reads data sectors stored in the target read page, and then sequentially outputs the data sectors to the controller. When all data sectors of a current page have been output by the memory, the memory must switch a target read page from the current page to a next page. Switching of a target read page requires a predetermined time period. Referring to FIG. 1, a schematic diagram of timings of read operations of a memory is shown. First, the memory spends a time period $T_1$ to switch a target read page to a first page of the memory. Assume that the first page stores K data sectors. The memory then spends K time periods $T_2$ to respectively read a first sector, a second sector, . . . , and a K-th sector of the first page and respectively output the first sector, the second sector, . . . , and the K-th sector of the first page to a ping-pong buffer of the controller. The memory then spends another time period $T_1$ to switch the target read page from the first page to a second page of the memory. The memory then spends K time periods $T_2$ to respectively read a first sector, a second sector, . . . , and a K-th sector of the second page and respectively output the first sector, the second sector, . . . , and the K-th sector of the second page to a ping-pong buffer of the controller.

Because changing of a target read page requires an extra time period $T_1$, when a memory changes the target read page, the ping-pong buffer of the controller must wait for a longer period $(T_1+T_2)$ to receive a next data sector, and the host also must wait a longer period to access data from the ping-pong buffer of the controller. Because an address range read by the host usually comprises a plurality of pages, when data stored in the address range is read, the memory must frequently switch a target read page, causing a long delay when executing the read operation; thus, degrading system performance. Thus, a method for handling data read out from a memory is required to shorten a delay period of a read operation; thereby improving system performance.

BRIEF SUMMARY OF THE INVENTION

The invention provides a method for handling data read out from a memory. In one embodiment, a controller corresponding to the memory comprises a ping-pong buffer, the ping-pong buffer comprises a first buffer and a second buffer, the memory comprises a plurality of pages, and each of the pages stores a plurality of data sectors. First, a first sector read time period required by the memory to read and output a data sector to the ping-pong buffer is calculated. A second sector read time period required by a host to read a data sector from the ping-pong buffer is then calculated. A page switch time period required by the memory to switch a target read page is then obtained. A total sector number is then determined according to the first sector read time period, the second sector read time period, and the page switch time period. When the memory outputs data to the ping-pong buffer, the first buffer and the second buffer of the ping-pong buffer are then switched to receive the data output by the memory according to the total sector number.

The invention also provides a data storage device. In one embodiment, the data storage device is coupled to a host, and comprises a memory and a controller. The memory comprises a plurality of pages for data storage, and each of the pages stores a plurality of data sectors. The controller comprises a ping-pong buffer for storing data output by the memory, calculates a first sector read time period required by the memory to read and output a data sector to the ping-pong buffer, calculates a second sector read time period required by the host to read the data sector from the ping-pong buffer, obtains a page switch time period required by the memory to switch a target read page, determines a total sector number according to the first sector read time period, the second sector read time period, and the page switch time period, and switches a first buffer and a second buffer of the ping-pong buffer to receive the data output by the memory according to the total sector number when the memory outputs data to the ping-pong buffer.

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 2:
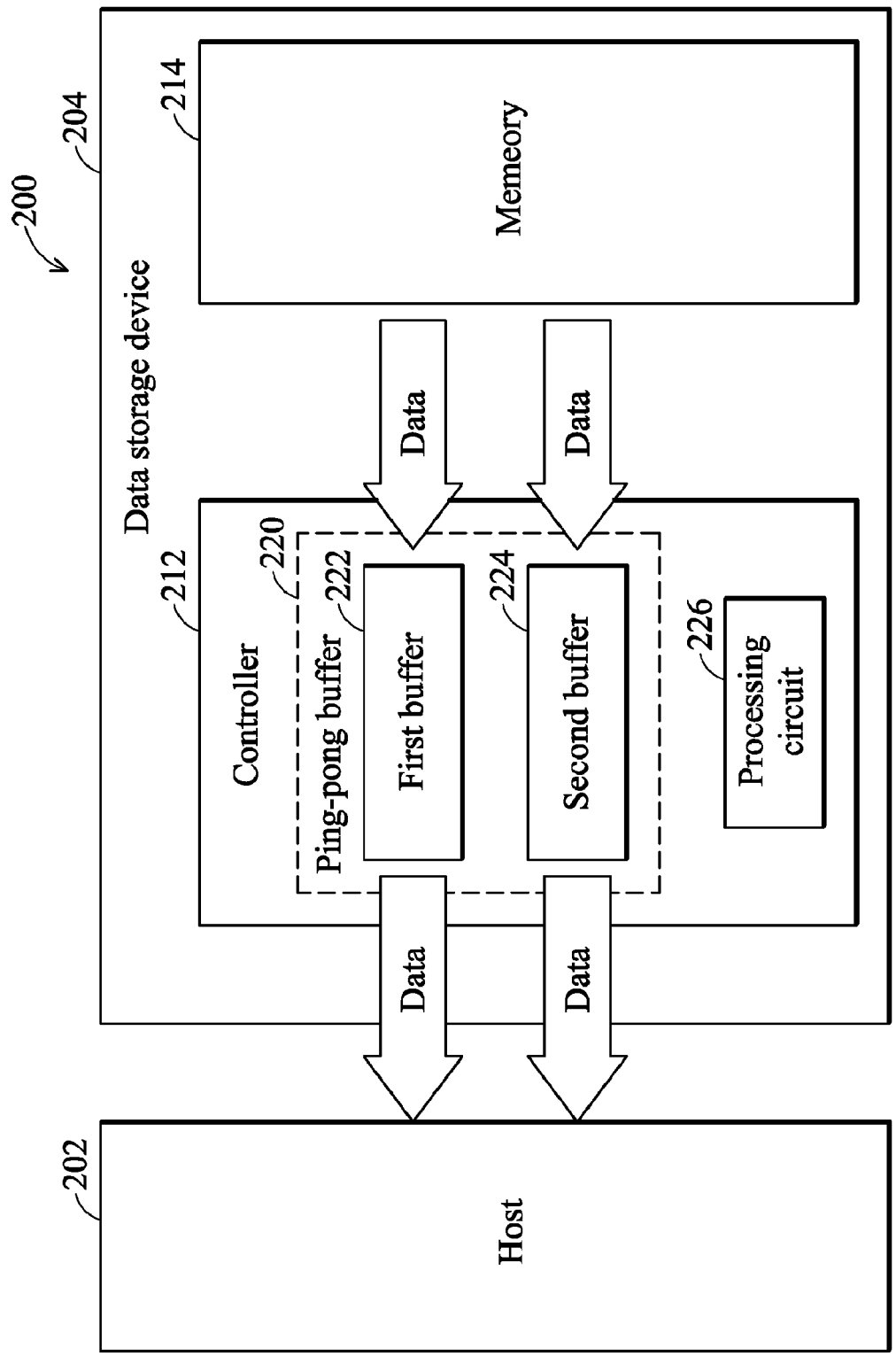
FIG. 2 is a block diagram of a data storage system according to the invention.

Referring to FIG. 2, a block diagram of a data storage system 200 according to the invention is shown. The data storage system 200 comprises a host 202 and a data storage device 204. The data storage device 204 comprises a controller 212 and a memory 214. The memory 214 comprises a plurality of blocks, each block comprises a plurality of pages, and each page can store a plurality of data sectors. The controller 212 comprises a ping-pong buffer 220. The controller 212 receives a read command from the host 202, and directs the memory 214 to read data stored therein according to the read command. After the memory 214 reads data, the memory outputs the data to the controller 212. The controller 212 then stores data received from the memory 214 in the ping-pong buffer 220.

The ping-pong buffer 220 comprises more than two buffers. In one embodiment, the ping-pong buffer 220 comprises a first buffer 222 and a second buffer 224. The controller 212 switches the first buffer 222 and the second buffer 224 to store data received from the memory 214 according to a total sector number. When the controller 212 receives data from the memory 214, the controller 212 first stores received data in the first buffer 222 of the ping-pong buffer 220. The controller 212 then determines whether a total number of data sectors stored in the first buffer 222 is equal to the total sector number. When the total number of data sectors stored in the first buffer 222 is equal to the total sector number, the controller 212 stores data received from the memory 214 into the second buffer 224 of the ping-pong buffer 220.

When the second buffer 224 receives data output by the memory 214, the controller 212 outputs data stored in the first buffer 222 to the host 202. The controller 212 determines whether a total number of data sectors stored in the second buffer 224 is equal to the total sector number. When the total number of data sectors stored in the second buffer 224 is equal to the total sector number, the controller 212 stores data received from the memory 214 into the first buffer 222 of the ping-pong buffer 220. When the first buffer 222 receives data output by the memory 214, the controller 212 outputs data stored in the second buffer 224 to the host 202. Thus, one buffer of the ping-pong buffer 220 receives data from the memory 214, and the other buffer of the ping-pong buffer 220 outputs data to the host 202.

The controller 212 therefore switches the first buffer 222 and the second buffer 224 of the ping-pong buffer 220 according to the total sector number. When a target read page of the memory 214 is switched from a prior page to a subsequent page, the memory 214 requires an extra period to switch the read target page. Note that a total sector number is not reached by the total number of data sectors which is stored in a target buffer of the ping-pong buffer 220 when the target read page is switched. After the target read page has been switched to the subsequent page and new data sectors read from the subsequent page has been sent to the target buffer of the ping-pong buffer 220, the total number of data sectors stored in the target buffer of the ping-pong buffer 220 is equal to the total sector number, and data stored in the target buffer is then output to the host 202. The host 202 therefore must wait a longer time period to receive new data from the ping-pong buffer 220 when the target read page of the memory 214 is switched. To reduce the waiting time period of the host 202, the controller 212 must carefully determine the total sector number for switching the first buffer 222 and the second buffer 224 of the ping-pong buffer 220, to improve performance of the data storage system 200.

Figure 1:
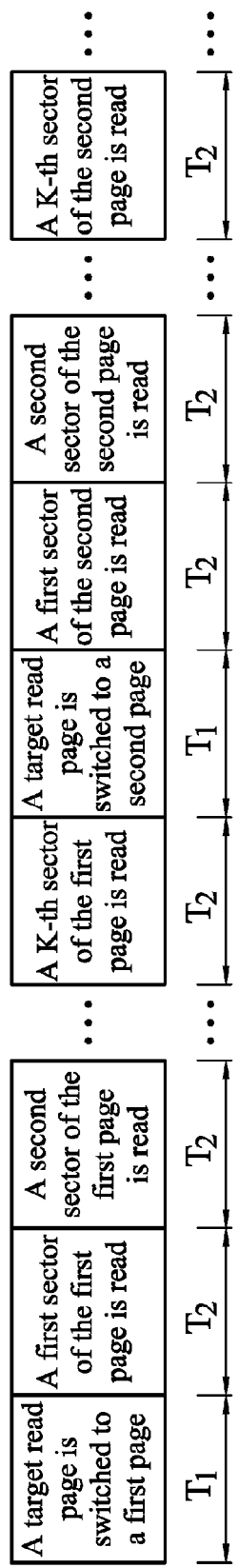
FIG. 1 is a schematic diagram of timings of read operations of a memory.
Figure 3:
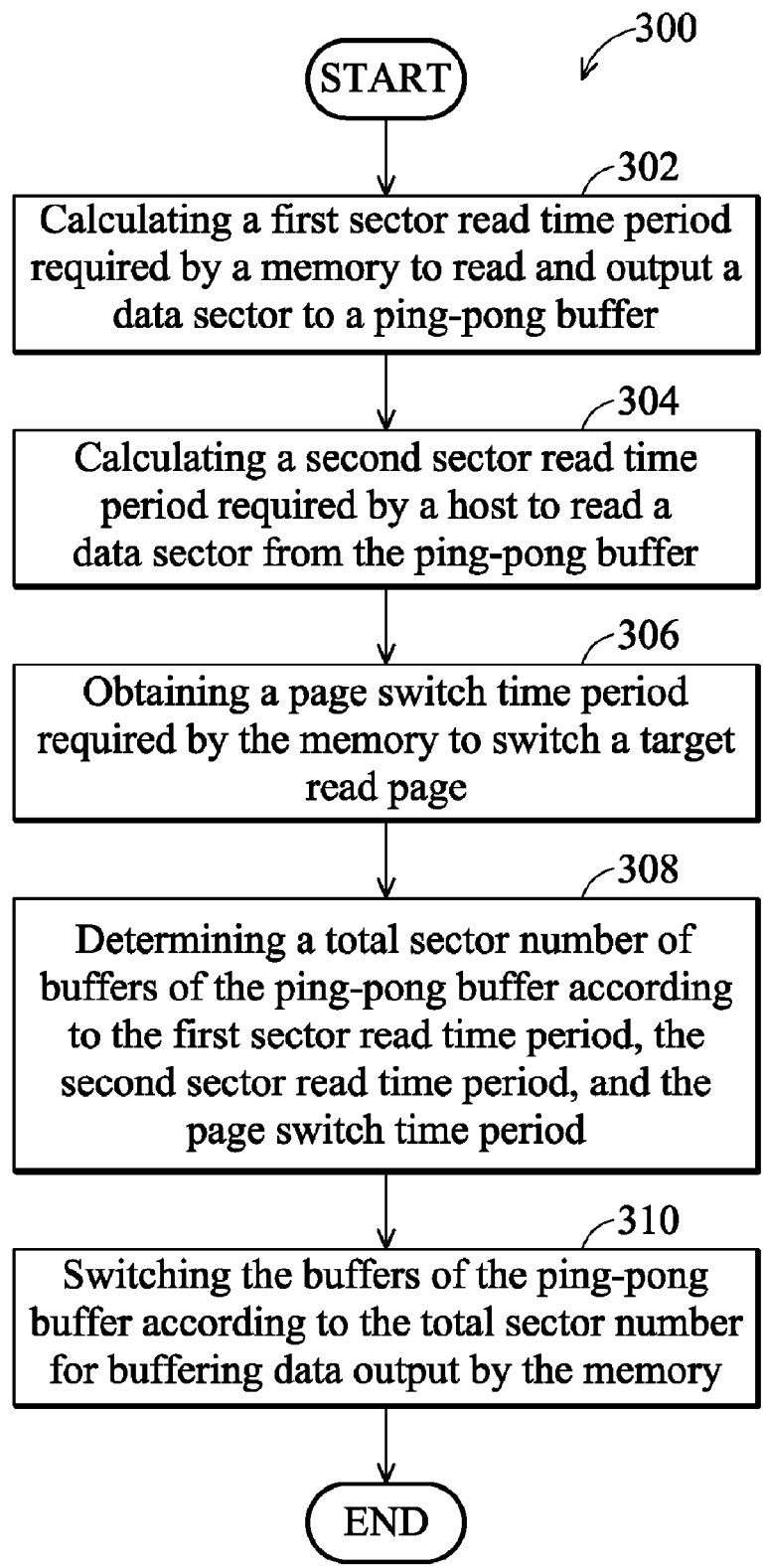
FIG. 3 is a flowchart of a method for calculating a total sector number for switching buffers of a ping-pong buffer according to the invention.

Referring to FIG. 3, a flowchart of a method 300 for calculating a total sector number for switching buffers of the ping-pong buffer 220 according to the invention is shown. In one embodiment, the controller 212 further comprises a processing circuit 226 which calculates the total sector number according to the method 300. First, the processing circuit 226 calculates a first sector read time period $T_A$ required by the memory 214 to read and output a data sector to the ping-pong buffer 220 (step 302). In one embodiment, the first sector read time period $T_A$ is equal to the time period $T_2$ shown in FIG. 1. In one embodiment, the processing circuit 226 obtains an operating frequency $f_m$ of the memory 214, obtains a sector byte number $N_B$ indicating a total number of bytes of a data sector, and divides the sector byte number $N_B$ by the operating frequency $f_m$ of the memory 214 to obtain the first sector read time period $T_A$. For example, if the operating frequency of the memory 214 is 33 MHz, and a data sector comprises 512 Bytes, the first sector read time period $T_A$ is therefore equal to $512/(33\times10^{-6})=16.7$ µs.

The processing circuit 226 then calculates a second sector read time period $T_B$ required by the host 202 to read a data sector from the ping-pong buffer 220 (step 304). In one embodiment, the processing circuit 226 obtains an operating frequency $f_h$ of the host, obtains a sector byte number $N_B$ indicating a total number of bytes of a data sector, and divides the total sector number $N_B$ by the operating frequency $f_h$ of the host 202 to obtain the second sector read time period $T_B$. For example, if the host 202 has an operating frequency of 25 MHz, and a data sector comprises 512 Bytes, the second sector read time period $T_B$ is therefore equal to $512/(25\times10^{-6})=20$ µs.

The processing circuit 226 then obtains a page switch time period $T_C$ required by the memory 214 to switch a read target page (step 306). In one embodiment, the page switch time period $T_C$ is equal to the time period $T_1$ shown in FIG. 1. The processing circuit 226 then determines a total sector number Ns of the ping-pong buffer 220 according to the first sector read time period $T_A$, the second sector read time period $T_B$, and the page switch time period $T_C$ (step 308). In one embodiment, the processing circuit 226 subtracts the first sector read time period $T_A$ from the second sector read time period $T_B$ to obtain a difference time period $T_d$, and then divides the first sector read time period $T_A$ by the difference time period $T_d$ to obtain a threshold value ($T_A/T_d$). The processing circuit 226 then selects a natural number which is approximate to or greater than the threshold value ($T_A/T_d$) as the total sector number Ns. For example, if the first sector read time period $T_A$ is 16.7 µs, the second sector read time period $T_B$ is 20 µs, and the page switch time period $T_C$ is 20 µs, the difference time period is therefore equal to (20 µs−16.7 µs)=3.3 µs, and the threshold value is equal to (20 µs/3.3 µs)=6.06. Thus, the processing circuit 227 may choose a natural number 6, which is approximate to the threshold value 6.06 to be the total sector number Ns.

In one embodiment, the processing circuit 226 obtains a page sector number Np indicating a total number of sectors in a page of the memory 214 as an upper limit for selecting the total sector number Ns. The processing circuit 226 therefore selects the total sector number Ns from the natural numbers ranging between the page sector number Np and the threshold value ($T_A/T_d$). For example, if each page of the memory 214 can store at most 8 data sectors, the processing circuit 224 selects the total sector number Ns from the natural numbers 6, 7, and 8 ranging between the threshold value 6.06 and the page sector number 8. After the total sector number Ns is determined, the controller 212 can then switch the buffers 222 and 224 of the ping-pong buffer 220 according to the total sector number Ns for buffering data output by the memory 214 (step 310). In other words, after a total number of data sectors stored in the first buffer 222 is equal to the total sector number Ns, the controller 212 stores subsequent data received from the memory 214 with the second buffer 224. After a total number of data sectors stored in the second buffer 224 is equal to the total sector number Ns, the controller 212 stores subsequent data received from the memory 214 with the first buffer 222.

The total sector number Ns is therefore calculated according to the following algorithm:

$$N_s = \frac{T_C}{(T_B - T_A)}; \qquad (1)$$

wherein $T_A$ is the first sector read time period, $T_B$ is the second sector read time period, and $T_C$ is the page switch time period. According to the circuit structure of the ping-pong buffer 220, a sum of a time period for the host 202 to read data from the ping-pong buffer 220 and a waiting time period Tw of the host 202 must be equal to a sum of a time period for the memory 214 to output data to the ping-pong buffer 220 and a page switch time period $T_C$ of the memory 214. Assume that a buffer of the ping-pong buffer 220 has a data capacity of Ns data sectors, the aforementioned time period equation is expressed as follows:

$$T_w + N_S \times T_B = T_C + N_S \times T_A; \qquad (2)$$

$$N_s = \frac{(T_C - T_W)}{(T_B - T_A)}; \qquad (3)$$

If the host 202 has a waiting time period Tw which is negligible, the data capacity Ns of the buffer of the ping-pong buffer 220 must be approximate to or greater than $T_C/(T_B-T_A)$; thus, the premise for deriving the algorithm (1).

Figure 4:
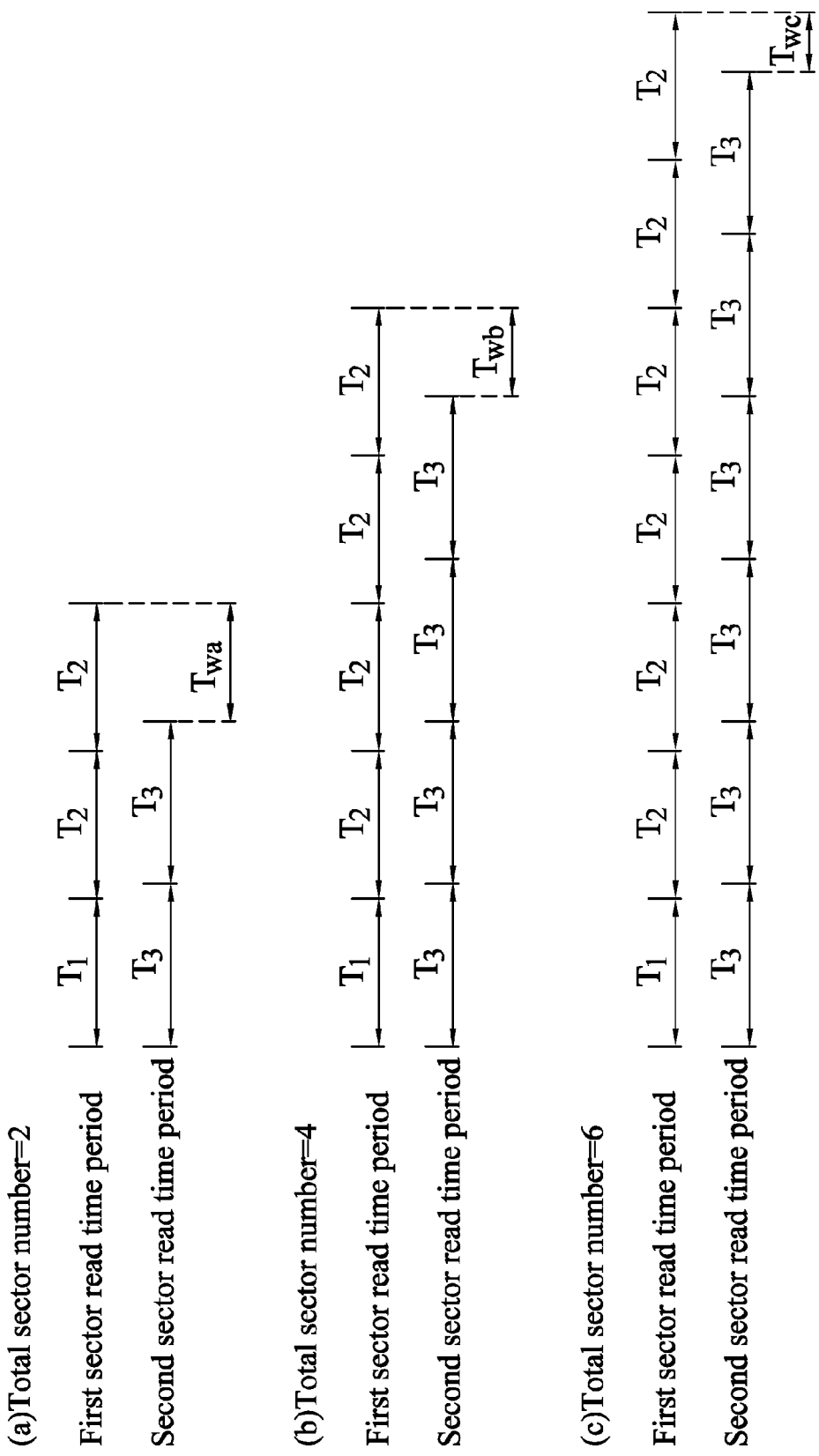
FIG. 4 is a schematic diagram of waiting time periods of a host when the ping-pong buffer is switched according to different total sector numbers.

Referring to FIG. 4, FIG. 4 is a schematic diagram of waiting time periods of the host 202 when the ping-pong buffer 220 is switched according to different total sector numbers. Assume that the page switch time period $T_C$ of the memory 214 is 20 μs, the first read sector time period $T_A$ of the memory 214 is 16.7 μs, and the second read sector time period $T_B$ of the host 202 is 20 μs. Under a mode (a) of FIG. 4, the total sector number Ns is set to the value 2. When the number of data sectors stored in one buffer of the ping-pong buffer 220 is equal to the total sector number 2, the controller 212 therefore uses the other buffer of the ping-pong buffer 220 to store data subsequently received from the memory 214. Assume that the memory 214 switches a target read page from which data is read and output. The memory 214 therefore requires a time period of ($T_C+2\times T_A$)=53.4 μs to read and store two data sectors into the ping-pong buffer 220, and the host 202 requires a time period of $2\times T_B$=40 μs to read two data sectors from the ping-pong buffer 220. Before the ping-pong buffer 220 outputs the two data sectors to the host 202, the host 202 must therefore wait for a waiting time period $T_{wa}$ of (53.4 μs−40 μs)=13.4 μs.

Under a mode (b) of FIG. 4, the total sector number Ns is set to the value 4. When the number of data sectors stored in one buffer of the ping-pong buffer 220 is equal to the total sector number 4, the controller 212 therefore uses the other buffer of the ping-pong buffer 220 to store data subsequently received from the memory 214. Assume that the memory 214 switches a target read page from which data is read and output. The memory 214 therefore requires a time period of ($T_C+4\times T_A$)=86.8 μs to read and store four data sectors into the ping-pong buffer 220, and the host 202 requires a time period of $4\times T_B$=80 μs to read four data sectors from the ping-pong buffer 220. Before the ping-pong buffer 220 outputs the four data sectors to the host 202, the host 202 must therefore wait for a waiting time period $T_{wb}$ of (86.8 μs−80 μs)=6.8 μs.

Under a mode (c) of FIG. 4, the total sector number Ns is set to the value 6. When the number of data sectors stored in one buffer of the ping-pong buffer 220 is equal to the total sector number 6, the controller 212 therefore uses the other buffer of the ping-pong buffer 220 to store data subsequently received from the memory 214. Assume that the memory 214 switches a target read page from which data is read and output. The memory 214 therefore requires a time period of ($T_C+6\times T_A$)=120.2 μs to read and store six data sectors into the ping-pong buffer 220, and the host 202 requires a time period of $6\times T_B$=120 μs to read six data sectors from the ping-pong buffer 220. Before the ping-pong buffer 220 outputs the six data sectors to the host 202, the host 202 must therefore wait for a waiting time period $T_{wc}$ of (120.2 μs−120 μs)=0.2 μs. According to the modes (a), (b), and (c) shown in FIG. 4, when the value of the total sector number Ns is increased, the waiting time period Tw of the host 202 is reduced. Thus, if the total sector number Ns is set to a value greater than or equal to 6, the waiting time period Tw of the host 202 is reduced to a level less than 0.2 μs; thereby improving performance of the data storage device 204.

Figure 5:
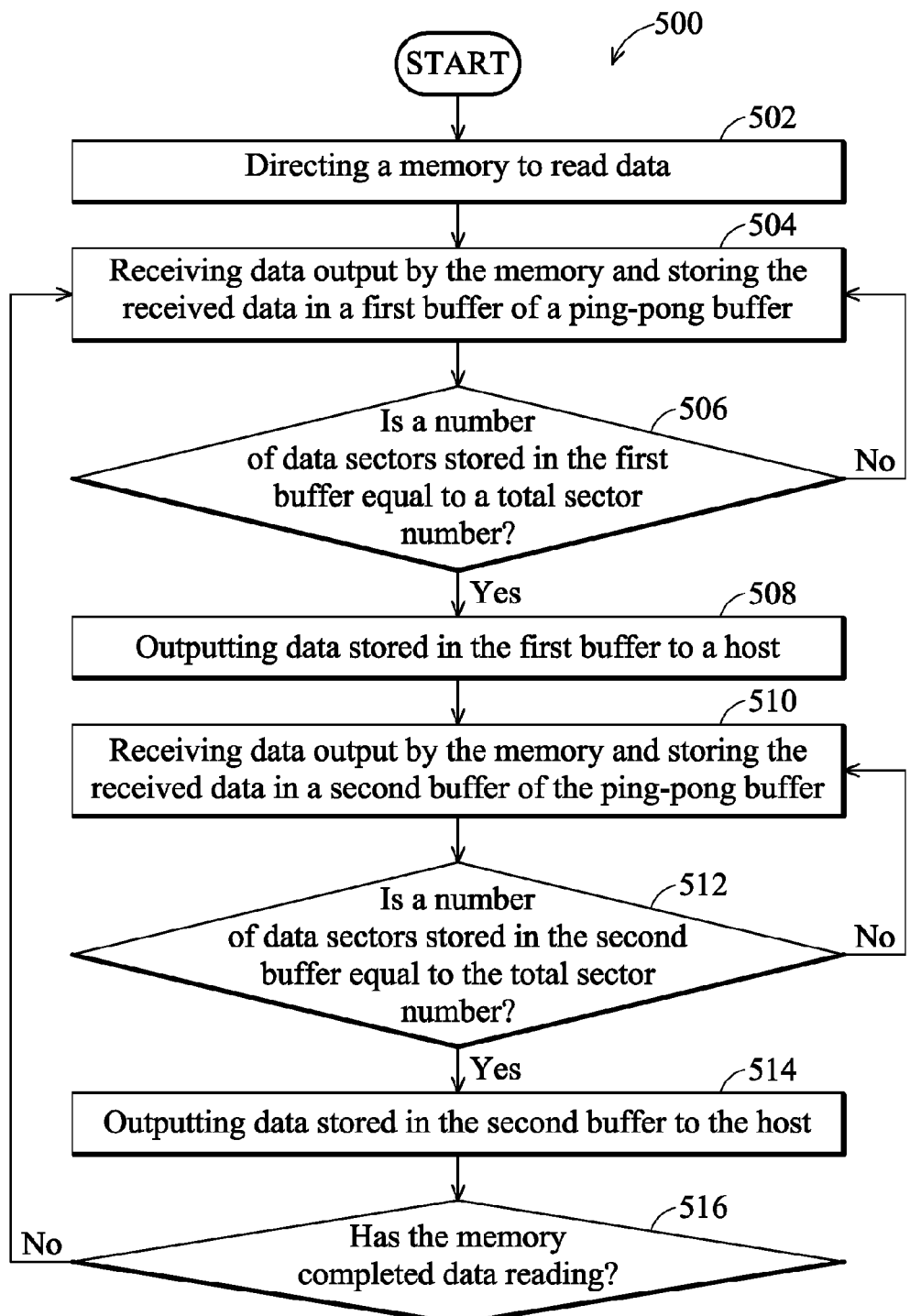
FIG. 5 is a flowchart of a method for switching a first buffer and a second buffer of the ping-pong buffer according to a total sector number according to the invention.

Referring to FIG. 5, a flowchart of a method 500 for switching a first buffer 222 and a second buffer 224 of the ping-pong buffer 220 according to a total sector number according to the invention is shown. First, the controller 212 directs the memory 214 to read data stored therein (step 502). The controller 212 then receives data output by the memory 214 and stores the received data in a first buffer 222 of the ping-pong buffer 220 (step 504). The controller 212 then determines a total number of data sectors stored in the first buffer 222 (step 506). If the total number of data sectors stored in the first buffer 222 is not equal to a total sector number, the controller 212 continues to store data received from the memory 214 into the first buffer 222 of the ping-pong buffer 220 (step 504). If the total number of data sectors stored in the first buffer 222 is equal to a total sector number (step 506), the controller 212 stores data received from the memory 214 into a second buffer 224 of the ping-pong buffer 220 instead of the first buffer 222 (step 510), and outputs data stored in the first buffer 222 to the host 202 (step 508).

When the controller 212 stores data received from the memory 214 to the second buffer 224, the controller 212 determines a total number of data sectors stored in the second buffer 224 (step 512). If the total number of data sectors stored in the second buffer 224 is not equal to the total sector number, the controller 212 continues to store data received from the memory 214 into the second buffer 224 of the ping-pong buffer 220 (step 510). If the total number of data sectors stored in the second buffer 224 is equal to the total sector number (step 512), the controller 212 stores data received from the memory 214 into the first buffer 222 of the ping-pong buffer 220 instead of the second buffer 224 (step 504), and outputs data stored in the second buffer 224 to the host 202 (step 514). The controller 212 continues executing the aforementioned process until the memory 214 completes data reading (step 516).

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A method for handling data read out from a memory, wherein a controller corresponding to the memory comprises a ping-pong buffer, the ping-pong buffer comprises a first buffer and a second buffer, the memory comprises a plurality of pages, and each of the pages stores a plurality of data sectors, comprising:
    calculating a first sector read time period required by the memory to read and output a data sector to the ping-pong buffer;
    calculating a second sector read time period required by a host to read a data sector from the ping-pong buffer;
    obtaining a page switch time period required by the memory to switch a target read page from one page to another page of the memory;
    determining a total sector number according to the first sector read time period, the second sector read time period, and the page switch time period; and
    when the memory outputs data to the ping-pong buffer, switching the first buffer and the second buffer of the ping-pong buffer to receive the data output by the memory according to the total sector number.

2. The method as claimed in claim 1, wherein calculation of the first sector read time period comprises:
    obtaining an operating frequency of the memory;
    obtaining a sector byte number indicating a total number of bytes of a data sector; and
    dividing the sector byte number by the operating frequency of the memory to obtain the first sector read time period.

3. The method as claimed in claim 1, wherein calculation of the second sector read time period comprises:
    obtaining an operating frequency of the host;
    obtaining a sector byte number indicating a total number of bytes of a data sector; and
    dividing the total sector number by the operating frequency of the host to obtain the second sector read time period.

4. The method as claimed in claim 1, wherein determination of the total sector number comprises:
    subtracting the first sector read time period from the second sector read time period to obtain a difference time period;
    dividing the first sector read time period by the difference time period to obtain a threshold value; and
    determining a target natural number, which is approximate to and greater than the threshold value, to be the total sector number.

5. The method as claimed in claim 4, wherein determination of the target natural number comprises:
    obtaining a page sector number indicating a total number of sectors in a page of the memory; and
    selecting the target natural number from the natural numbers that are less than the page sector number and greater than the threshold value.

6. The method as claimed in claim 1, wherein switching of the first buffer and the second buffer comprises:
    directing the memory to read data;
    receiving data output by the memory, and storing the received data into the first buffer;
    determining whether a total number of data sectors stored in the first buffer is equal to the total sector number;
    when the total number of data sectors stored in the first buffer is equal to the total sector number, receiving data output by the memory, and storing the received data into the second buffer.

7. The method as claimed in claim 6, wherein switching of the first buffer and the second buffer further comprises:
    determining whether a total number of data sectors stored in the second buffer is equal to the total sector number;
    when the total number of data sectors stored in the second buffer is equal to the total sector number, receiving data output by the memory, and storing the received data into the first buffer.

8. The method as claimed in claim 7, wherein switching of the first buffer and the second buffer further comprises:
    when the received data is stored into the first buffer, outputting data stored in the second buffer to the host; and
    when the received data is stored into the second buffer, outputting data stored in the first buffer to the host.

9. A data storage device, coupled to a host, comprising:
    a memory, comprising a plurality of pages for data storage, wherein each of the pages stores a plurality of data sectors; and
    a controller, comprising a ping-pong buffer for storing data output by the memory, calculating a first sector read time period required by the memory to read output a data sector to the ping-pong buffer, calculating a second sector read time period required by the host to read the data sector from the ping-pong buffer, obtaining a page switch time period required by the memory to switch a target read page, and determining a total sector number according to the first sector read time period, the second sector read time period, and the page switch time period, and when the memory outputs data to the ping-pong buffer, switching a first buffer and a second buffer of the ping-pong buffer to receive the data output by the memory according to the total sector number.

10. The data storage device as claimed in claim 9, wherein the controller obtains an operating frequency of the memory, obtains a sector byte number indicating a total number of bytes of a data sector, and divides the sector byte number by the operating frequency of the memory to obtain the first sector read time period, to calculate the first sector read time period.

11. The data storage device as claimed in claim 9, wherein the controller obtains an operating frequency of the host, obtains a sector byte number indicating a total number of bytes of a data sector, and divides the total sector number by the operating frequency of the host to obtain the second sector read time period, to calculate the second sector read time period.

12. The data storage device as claimed in claim 9, wherein the controller subtracts the first sector read time period from the second sector read time period to obtain a difference time period, divides the first sector read time period by the difference time period to obtain a threshold value, and determines a target natural number, which is approximate to and greater than the threshold value, to be the total sector number, to determine the total sector number.

13. The data storage device as claimed in claim 12, wherein the controller obtains a page sector number indicating a total number of sectors in a page of the memory, and selects the target natural number from the natural numbers that are less than the page sector number and greater than the threshold value, to determine the target natural number.

14. The data storage device as claimed in claim 9, wherein the controller directs the memory to read data, stores data output by the memory into the first buffer, determines whether a total number of data sectors stored in the first buffer is equal to the total sector number, and when the total number of data sectors stored in the first buffer is equal to the total sector number, stores data output by the memory into the second buffer, to switch the first buffer and the second buffer of the ping-pong buffer to receive the data.

15. The data storage device as claimed in claim 14, wherein the controller further determines whether a total number of data sectors stored in the second buffer is equal to the total sector number, and when the total number of data sectors stored in the second buffer is equal to the total sector number, stores data output by the memory into the first buffer, to switch the first buffer and the second buffer further.

16. The data storage device as claimed in claim 15, wherein the controller outputs data stored in the second buffer to the host when the received data is stored into the first buffer, and outputs data stored in the first buffer to the host when the received data is stored into the second buffer, to switch the first buffer and the second buffer.

* * * * *